US012313352B2

(12) United States Patent
Klausner et al.

(10) Patent No.: US 12,313,352 B2
(45) Date of Patent: May 27, 2025

(54) HEAT EXCHANGER AND METHOD OF MAKING SAME

(71) Applicant: Board of Trustees of Michigan State University, East Lansing, MI (US)

(72) Inventors: James F. Klausner, Haslett, MI (US); André Bénard, Okemos, MI (US); Patrick Youngseon Kwon, Okemos, MI (US); Haseung Chung, Ann Arbor, MI (US); Himanshu Sahasrabudhe, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 361 days.

(21) Appl. No.: 17/625,186

(22) PCT Filed: Jul. 2, 2020

(86) PCT No.: PCT/US2020/040616
§ 371 (c)(1),
(2) Date: Jan. 6, 2022

(87) PCT Pub. No.: WO2021/007093
PCT Pub. Date: Jan. 14, 2021

(65) Prior Publication Data
US 2022/0373273 A1    Nov. 24, 2022

Related U.S. Application Data

(60) Provisional application No. 62/871,908, filed on Jul. 9, 2019.

(51) Int. Cl.
*F28F 3/04*    (2006.01)
*B22F 3/16*    (2006.01)
(Continued)

(52) U.S. Cl.
CPC .......... *F28F 3/04* (2013.01); *B22F 3/16* (2013.01); *B22F 3/24* (2013.01); *F28D 9/005* (2013.01);
(Continued)

(58) Field of Classification Search
CPC . B22F 3/15; B22F 3/16; F28F 2255/18; F28F 2255/08; F28F 3/048; F28F 3/10; F28F 2215/04; F28F 3/04; F25B 2309/061
See application file for complete search history.

(56) References Cited

U.S. PATENT DOCUMENTS 3,698,962 A    10/1972  Kasak et al.
6,830,736 B1   12/2004  Lamla et al.
(Continued)

FOREIGN PATENT DOCUMENTS

CN    101340799 A  *  1/2009  ............... F28F 3/02
CN    201712222 U  *  1/2011
(Continued)

OTHER PUBLICATIONS

Quinn et al. (Quinn, Gregory, Jeremy Strange, and Mark Zaffetti. "Evolution of an Additive Manufactured Heat Exchanger for PLSS 2.5." 48th International Conference on Environmental Systems, 2018) (Year: 2018).*
(Continued)

*Primary Examiner* — Schyler S Sanks
(74) *Attorney, Agent, or Firm* — Harness, Dickey & Pierce, PLC

(57) ABSTRACT

A heat exchanger and method of making same are disclosed. In another aspect, a method of making a heat exchanger includes sintering powder metal and hot isostatic pressing of the powder metal. Moreover, an aspect of the present heat exchanger apparatus employs plates in a stacked arrangement with supercritical-$CO_2$ flowing between the plates and
(Continued)

between adjacent fins. Still another aspect of a heat exchanger apparatus is made of a nickel-based alloy.

21 Claims, 9 Drawing Sheets

(51) Int. Cl.
    *B22F 3/24*     (2006.01)
    *F28D 9/00*     (2006.01)

(52) U.S. Cl.
    CPC ..... *B22F 2003/247* (2013.01); *F28F 2230/00* (2013.01); *F28F 2255/18* (2013.01)

(56) References Cited

U.S. PATENT DOCUMENTS

| | | |
|---|---|---|
| 7,900,811 B1 | 3/2011 | Alman et al. |
| 2003/0161104 A1* | 8/2003 | Hartzell ............... F28F 3/12 |
| | | 257/E23.098 |
| 2004/0182556 A1 | 9/2004 | Jahn et al. |
| 2006/0090887 A1* | 5/2006 | Kato ............... F28F 3/048 |
| | | 165/166 |
| 2007/0084593 A1 | 4/2007 | Besant et al. |
| 2010/0081726 A1 | 4/2010 | Tonkovich et al. |
| 2011/0008198 A1 | 1/2011 | Hou |
| 2011/0142711 A1* | 6/2011 | Ukai ............... C22C 19/007 |
| | | 420/441 |
| 2013/0213449 A1* | 8/2013 | Parish ............... F28F 9/0265 |
| | | 136/224 |
| 2014/0102101 A1 | 4/2014 | Xie et al. |
| 2016/0273368 A1* | 9/2016 | Smarsly ............... B22F 3/14 |
| 2017/0023312 A1 | 1/2017 | Urbanski |
| 2017/0211899 A1 | 7/2017 | Gabay et al. |
| 2019/0033013 A1 | 1/2019 | Byfield |
| 2019/0062892 A1* | 2/2019 | Anderson ............... C23C 8/02 |
| 2019/0162083 A1 | 5/2019 | Wygant |
| 2021/0325124 A1 | 10/2021 | Klausner et al. |

FOREIGN PATENT DOCUMENTS

| | | | |
|---|---|---|---|
| EP | 0183007 A1 | 4/1986 | |
| EP | 507364 A1 * | 10/1992 | ........... C22C 1/1084 |

OTHER PUBLICATIONS

CN-101340799—A Translation (Year: 2009).*
CN201712222U Translation (Year: 2011).*
EP-507364-A1 Translation (Year: 1992).*
Musgrove, et al., "Fundamentals and Applications of Supercritical Carbon Dioxide (sCO$^2$) Based Power Cycles," Elsevier Ltd. (2017).
Tsuzuki, N., et al., "Advanced Microchannel Heat Exchanger with S-shaped Fins," Journal of Nuclear Science and Technology, vol. 46 at p. 403 (2009).
Chordia, L., et al., "Opportunities & Challenges for sub-Megawatt & Modular Supercritical Cycles," Thar Energy LLC, High Efficiency High-Temp Modular Power Workshop, Washington, D.C. (Oct. 19, 2017).

* cited by examiner

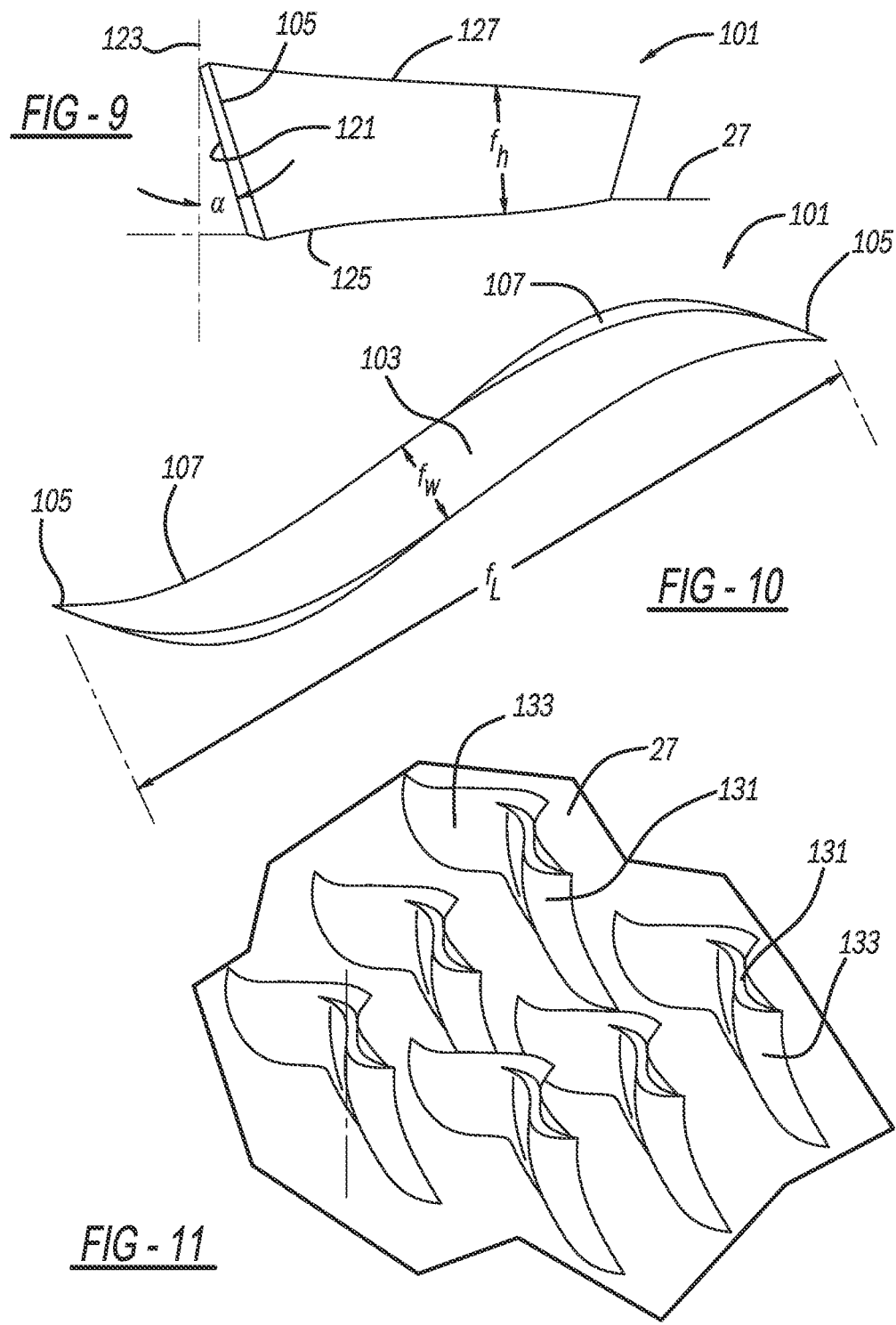

HEAT EXCHANGER AND METHOD OF MAKING SAME

CROSS-REFERENCE TO RELATED APPLICATIONS

This application is a national phase entry of PCT international patent application No. PCT/US2020/040616, filed on Jul. 2, 2020, which claims priority to U.S. Provisional Application Ser. No. 62/871,908, filed on Jul. 9, 2019, which are incorporated by reference herein.

BACKGROUND AND SUMMARY

The present application relates generally to heat exchangers and more particularly to a method of making a heat exchanger component, a specific construction of a heat exchanger apparatus and an alloy of a heat exchanger apparatus.

Generally, heat exchangers are devices used to transfer heat between two or more fluids which may be separated by a solid wall to prevent mixing. Such heat exchangers are commonly used for refrigeration, power plants, chemical plants, internal combustion engines and even in passive heat sinks. More specifically, a plate heat exchanger uses stacked metal plates to transfer heat between two fluids. The stacked plates are usually corrugated stamped aluminum or steel and are held together between a head plate and an opposite follower plate with carrying bars and clamping bolts spanning therebetween. An example of a conventional heat exchanger is disclosed in U.S. Patent Publication No. 2019/0033013 entitled "Heat Exchanger and Method of Manufacturing a Heat Exchanger" which published to Byfield on Jan. 31, 2019, which is incorporated by reference herein.

Traditional heat exchangers, however, are not well suited for use with supercritical-$CO_2$ ("sc-$CO_2$") working fluid. Conventional stamped sheet metal heat exchanger plates are not strong enough to resist sc-$CO_2$ pressure differentials and high temperatures without undesired and significant deformation thereof. Examples of sc-$CO_2$ heat exchangers are disclosed in U.S. Patent Publication No. 2019/0162083 entitled "Power Generation System Using Supercritical Carbon Dioxide" which published to Wygant on May 30, 2019; and U.S. Patent Publication No. 2014/0102101 entitled "Supercritical Carbon Dioxide Power Cycle for Waste Heat Recovery" which published to Xie et al. on Apr. 17, 2014; both of which are incorporated by reference herein. Moreover, sc-$CO_2$ heat exchangers and power systems are disclosed in Musgrove et al., entitled "Fundamentals and Applications of Supercritical Carbon Dioxide (sc-$CO_2$) Based Power Cycles," (2017); and Tsuzuki et al., "Advanced Microchannel Heat Exchanger with S-shaped Fins," Journal of Nuclear Science and Technology, Vol. 46 at 403 (2009). While these references generally describe sc-$CO_2$ power systems or theoretical modeling thereof, there is still an unfulfilled need to create commercially feasible heat exchanging components suitable for sc-$CO_2$ use which are strong and cost effective.

In accordance with the present invention, a heat exchanger and method of making same are disclosed. In another aspect, a method of making a heat exchanger includes sintering powder metal and hot isostatic pressing of the powder metal. In a further aspect, direct metal laser sintering is employed. Another aspect uses compacting of the metal powder and yet a further aspect attaches a gasket to the heat exchanger component. Another aspect of the present heat exchanger apparatus includes a heat exchanger plate from which project multiple heat-exchanging fins or ribs including an overhang and/or three-dimensional twist. At least one of the fins or ribs has a generally S-shape and an undercut sidewall in a further aspect. Moreover, an aspect of the present heat exchanger apparatus employs multiples of the plates in a stacked arrangement with supercritical-$CO_2$ flowing between the plates and between adjacent fins. Still another aspect of a heat exchanger apparatus is made of a nickel-based alloy.

The present heat exchanger and method are advantageous over traditional heat exchangers and methods of making same. For example, the present heat exchanger can be made in a less expensive and smaller size manner yet withstand significant pressure differentials and high temperatures of sc-$CO_2$ working fluids. Furthermore, the present heat exchanger apparatus is resistant to corrosion, especially that caused by sc-$CO_2$ for example. Moreover, the present apparatus and method are expected to increase the efficiency of heat transference. Additional advantages and features of the present heat exchanger and method will become apparent from the following description and appended claims, taken in conjunction with the accompanying drawings.

BRIEF DESCRIPTION OF THE DRAWINGS

FIG. 9 is an end elevational view showing the first embodiment fin of the present heat exchanger;

FIG. 10 is an enlarged front elevational view showing the first embodiment fin of the present heat exchanger;

FIG. 11 is a fragmentary and enlarged perspective view showing a second embodiment of the fins of the present heat exchanger;

DETAILED DESCRIPTION

Figure 1:
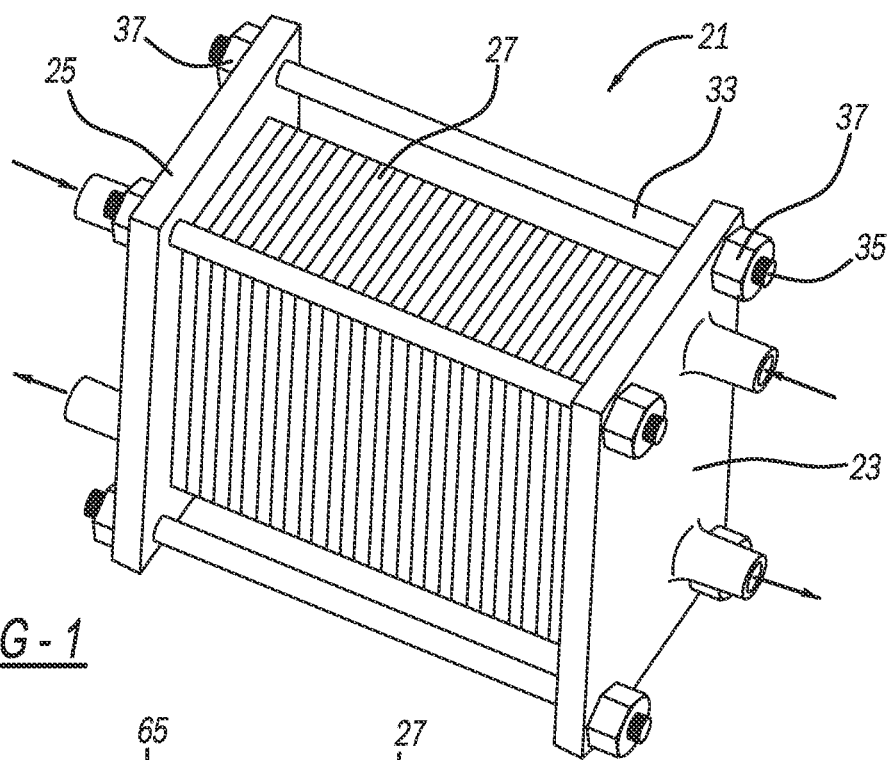
FIG. 1 is a perspective view of the present heat exchanger.
Figure 2:
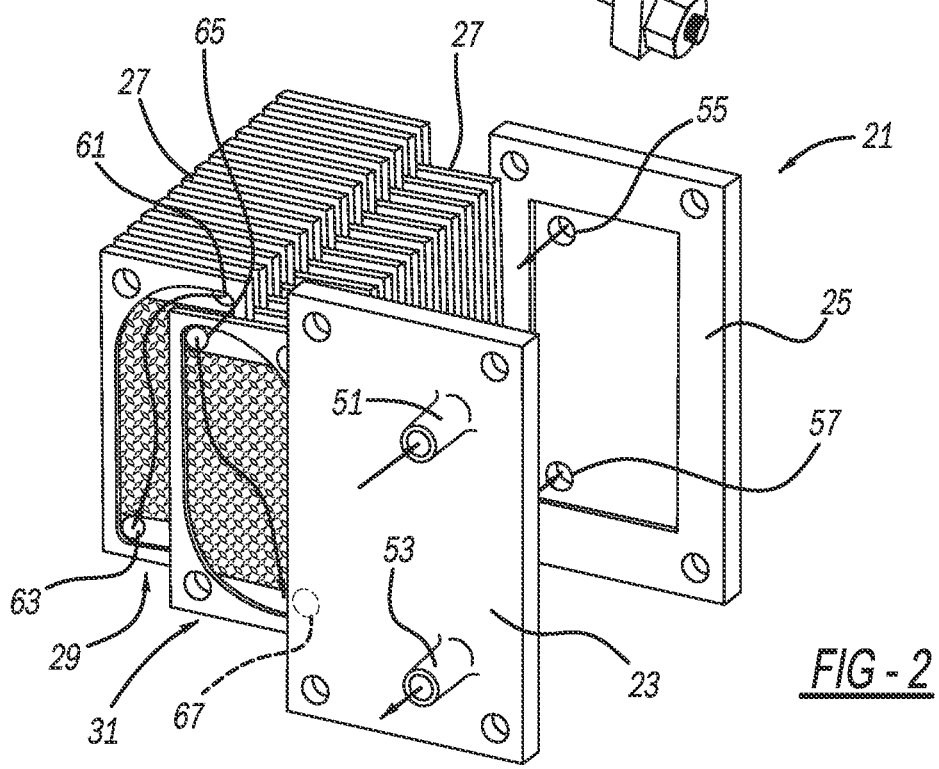
FIG. 2 is a partially exploded perspective view of the present heat exchanger.

An exemplary heat exchanger apparatus 21 is illustrated in FIGS. 1 and 2. Heat exchanger 21 includes a head plate 23, a follower or end plate 25, and multiple stacked heat exchanger plates 27 therebetween. Heat exchanger plates 27 include alternating hot side exchanger plates 29 and cold side exchanger plates 31. Tie bars 33 and corresponding threaded clamping bolts 35 span between head plate 23 and follower plate 25, and act with corresponding nuts 37 to retain and compress heat exchanger plates 27 therebetween. Optionally, additional upper and lower carrying bars may also be employed to secure the heat exchanger plates thereupon.

A hot fluid inlet port 51 and a cold fluid outlet port 53 have generally cylindrically projecting collars for mounting to elongated tubes, with through-holes therein. Conversely, follower plate 25 includes a cold fluid inlet port 55 and a hot fluid outlet port 57 which are also coupled to elongated tubes via collars. Hot side heat exchanger plates 29 include a hot fluid inlet hole 61 and a hot fluid outlet hole 63 which are generally diametrically opposite each other adjacent corners of the plates. Conversely, cold side heat exchanger plates 31 include a cold fluid outlet hole 65 and a cold fluid inlet hole 67 also being diametrically opposed to each other. The hot fluid holes are aligned with each other and the cold fluid holes are aligned with each other. Thus, in operation, the fluid flows across a central nominal surface area of each heat exchanger plate 27 from an upper inlet hole to a lower bottom hole in different directions depending on whether it is the hot fluid or the colder fluid flow path.

Figure 3:
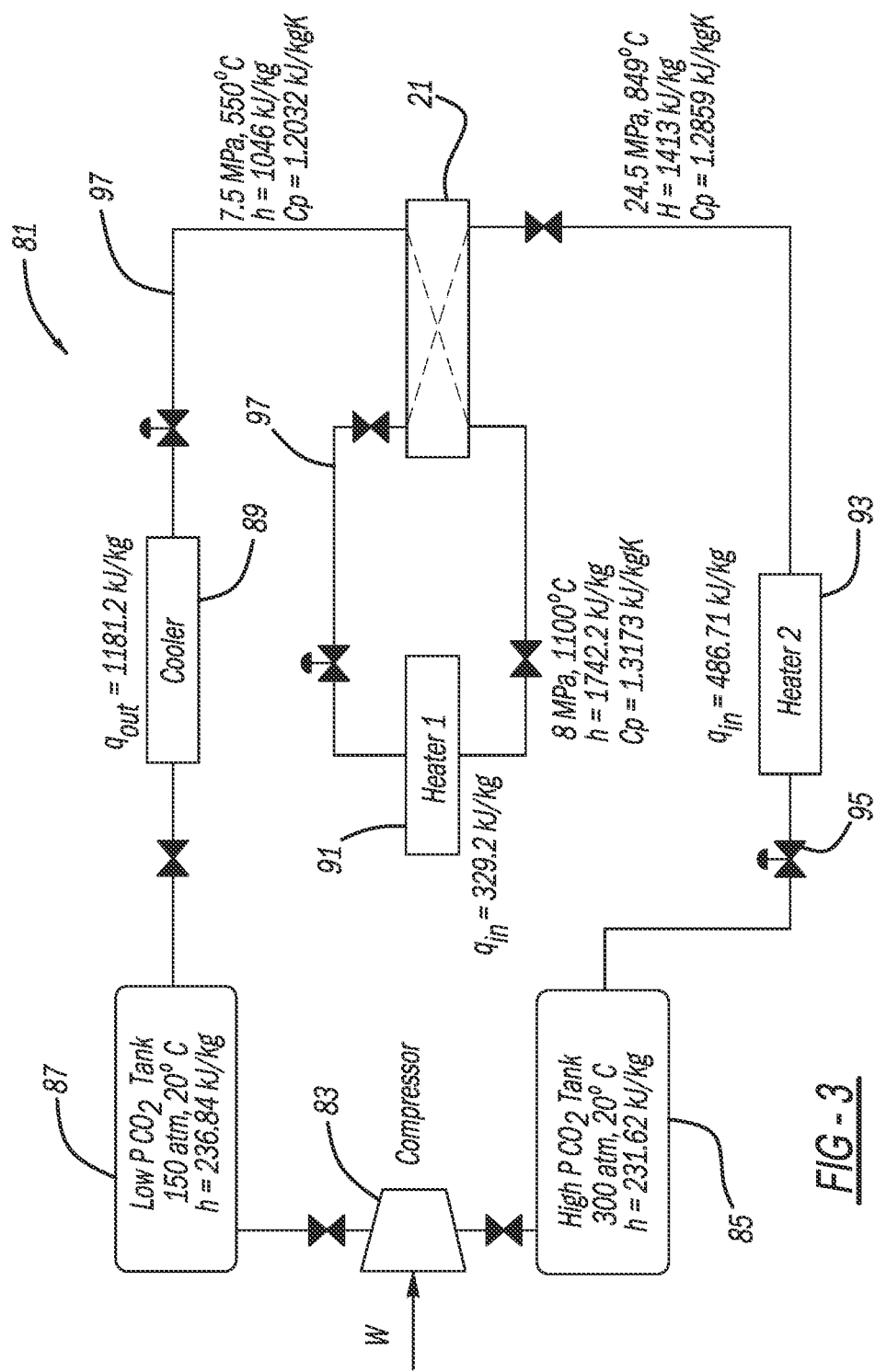
FIG. 3 is a diagrammatic view showing a power plant system employing the present heat exchanger.

FIG. 3 shows an exemplary power generation circuit using the present heat exchanger 21. Power generation circuit 81 additionally includes a compressor 83, such as a rotatable turbine, a high pressure fluid tank 85, a low pressure fluid tank 87, a cooler or a chiller 89, a first heater 91 and a second heater 93. Various expansion valves 95 and elongated fluid carrying tubes 97 are also present between the different heat exchanging components. It should be appreciated, however, that other heat exchanging circuits and power generation circuits may be employed, such as those using a recouperator, water separator, boiler, combustor, generator, pump and the like.

The present heat exchanger employs supercritical-Carbon Dioxide as the working fluid, preferably operating at a high temperature range of about 300-1100° C. (more preferably 800-1100° C.) and a pressure range of about 80-250 bar (more preferably 100-250 bar). An attainable hot side inlet temperature and pressure typically exceeds 1100° C. and 80 bar, respectively, while at the same time, a cold side inlet temperature and pressure typically exceeds 300° C. and 250 bar, respectively. In sc-$CO_2$ power generation, an 80 bar sc-$CO_2$ stream captures the high temperature heat from sources such as nuclear reactors, industrial furnaces (glass or reverberatory metal processing), direct natural gas combustion, natural gas flaring, or solar concentrators. The heat exchanger then transfers heat from the 80 bar sc-$CO_2$ stream to a 250 bar sc-$CO_2$ stream with an outlet temperature of 900° C. The high temperature, high pressure sc-$CO_2$ stream is then expanded across a turbine to generate power. A HIPPED manufacturing process, as will be discussed in greater detail hereinafter, extends the operational range for indirect heat exchange to extreme conditions where traditional heat exchangers cannot operate: conventional plate type heat exchangers typically operate at pressures below 100 bar and temperatures below 800° C.

Figure 4:
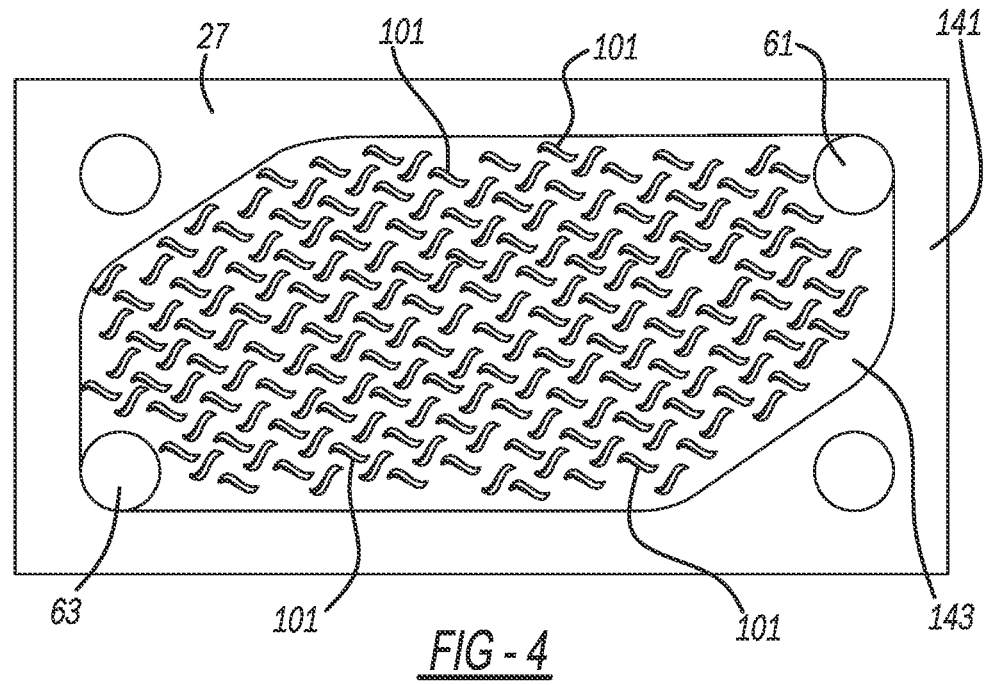
FIG. 4 is a front elevational view showing a plate of the present heat exchanger.
Figure 5:
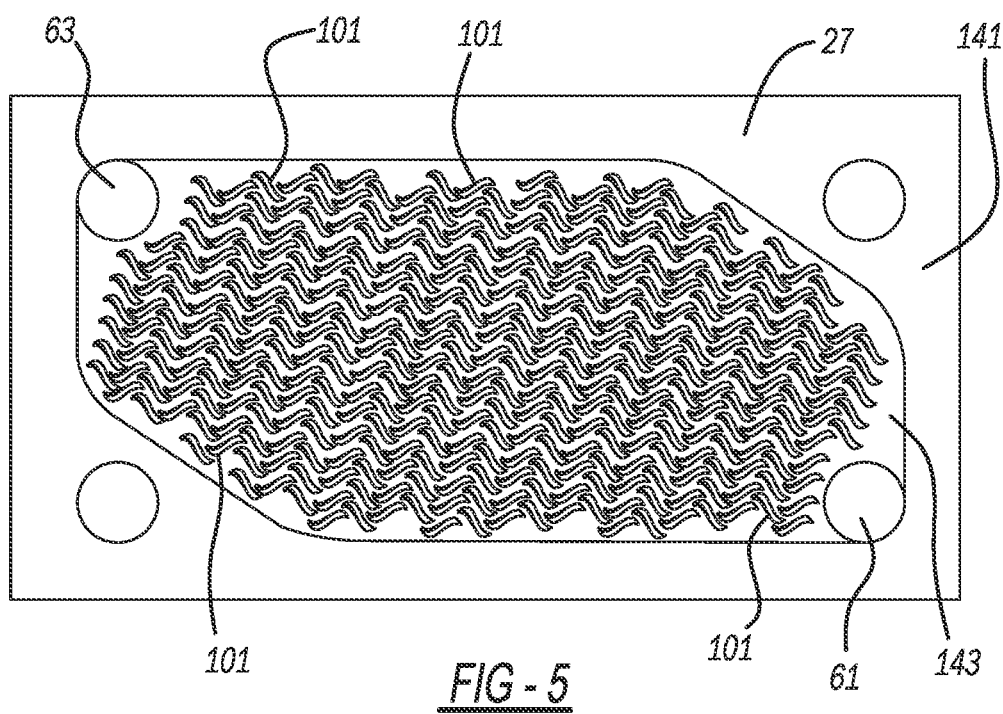
FIG. 5 is a rear elevational view showing the plate of the present heat exchanger.
Figure 6:
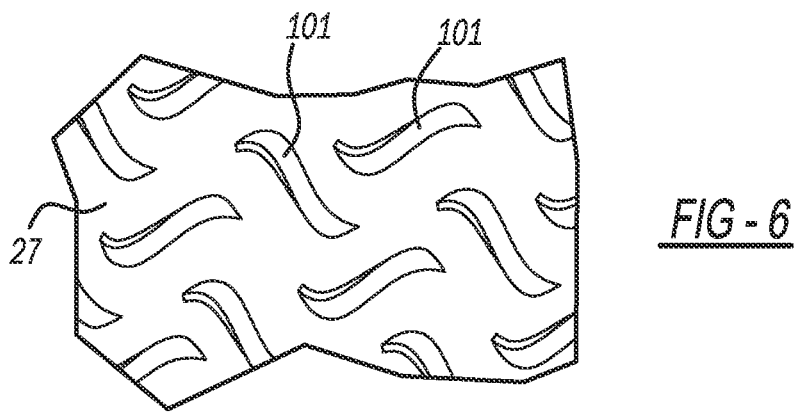
FIG. 6 is an enlarged and fragmentary elevational view showing a first embodiment of fins employed in the present heat exchanger.
Figure 7:
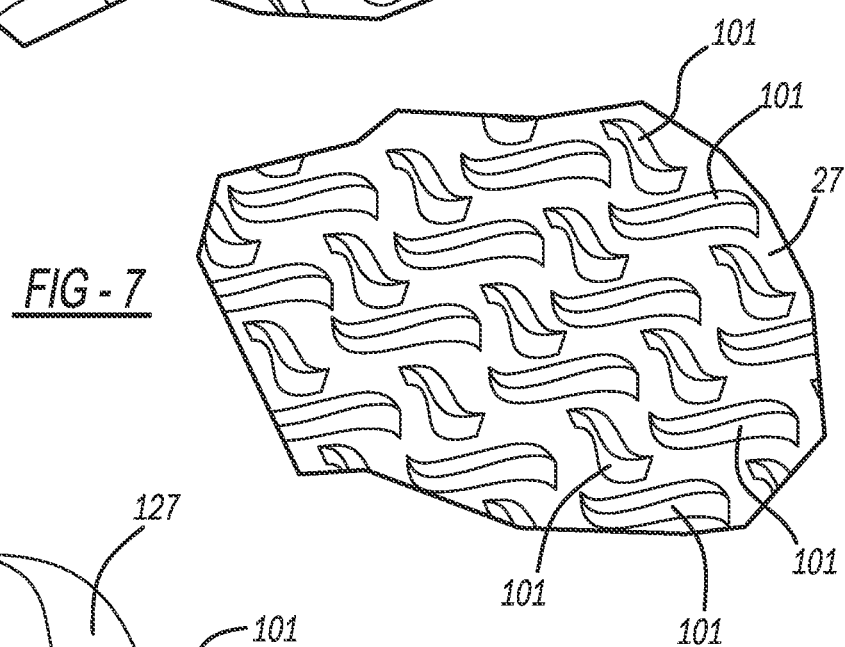
FIG. 7 is a fragmentary and enlarged perspective view showing the first embodiment fins of the present heat exchanger.
Figure 8:
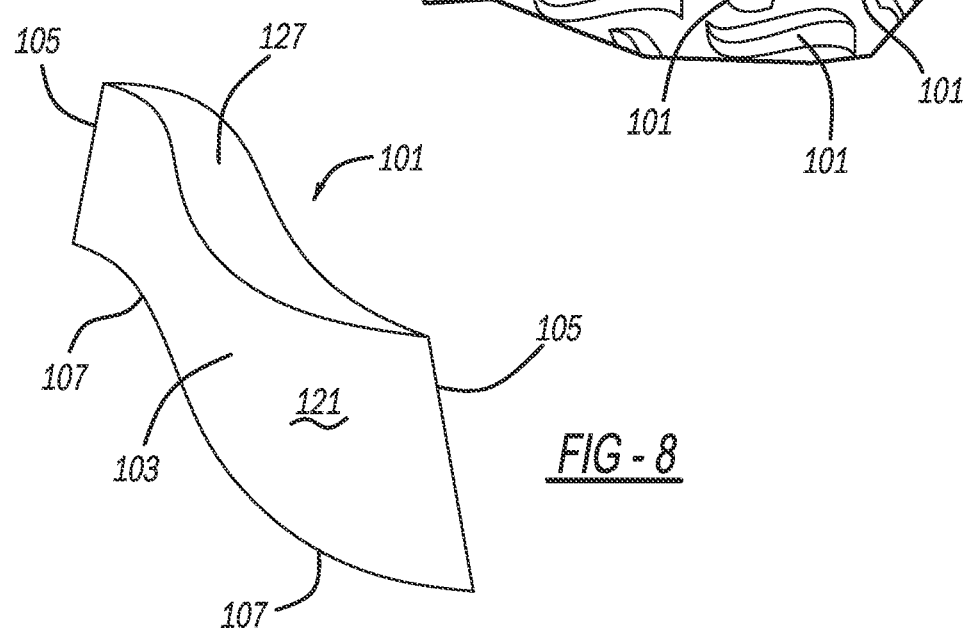
FIG. 8 is an enlarged perspective view showing one of the first embodiment fins of the present heat exchanger.

Each 4 mm thick high stiffness plate 27 is covered with an array of closely packed and precisely formed, three dimensional fins or ribs 101. These fins 101 each have a generally S-shape with an elongated middle section 103, pointy ends 105, and curves 107 therebetween. Fins 101 serve to enhance fluid mixing through turbulence and thus provide heat transfer intensification as well as provide rigidity to deter plate deformation under high pressure. The width $f_w$ of each fin 101 ranges in size from 0.8 to 8 mm and are designed to have a very low pressure drop of the sc-$CO_2$ working fluid moving along the flow path between adjacent fins 101. Each fin 101 is solid without a reverse indentation thereby providing increased torsional resistance to strengthen plate 27. Fins 101 are spaced apart from each other but in an offset and overlapping arrangement between inlet port 61 and outlet port 63. The S-shaped nature of each fin as well as the sharp pointy ends thereof, and their fin-to-fin overlapping configuration enhance working fluid turbulence and therefore heat transfer. This expected heat transfer efficiency will allow for a reduction in the heat exchanger plate size, especially for use with sc-$CO_2$, as compared to prior heat exchanger plates . The spacing between fins may be different on one side of the plate versus the other as can be observed by comparing the opposite faces of plate 27 in FIGS. 4 and 5.

Furthermore, each fin 101 preferably has a three dimensional twist between ends 105. This twist also optionally provides an overhanging sidewall surface 121 relative to a line 123 which is perpendicular to nominal face surface 143 of plate 27. Conversely, this provides an undercut shape of a proximal portion 125 versus enlarged and overhanging distal surface 127 for each fin. An undercut or overhanging angle $\alpha$ is preferably between 1-30° (more preferably 25°) from line 123. This overhanging and twisted shape are ideally suited for being manufactured in the additive manufacturing processes discussed hereinafter since they would otherwise be die-locked if made through conventional stamping or casting processes. Furthermore, the undercut and twisted formations are expected to further increase heat transfer by exposing greater surface area of each fin to the working fluid passing therealong while also further controlling fluid flow characteristics of the sc-$CO_2$.

It is also noteworthy that elongated length $f_L$ of each fin 101 between ends 105 is at least four times greater than a height $f_h$ or width $f_w$. For example, each fin may be 1 mm wide and 7 mm long. Moreover, approximately 6-10 mm and more preferably 8 mm, spacing is between the middle sections of adjacent fins 101 to provide fluid flow channels therebetween raised above nominal flat surface 143 of the associated plate 27. There are at least fifty ribs 101 on each side of each plate 27. Although there may be a greater fin quantity or spacing difference on one sider versus the other. However, an alternate configuration of each fin 131 is shown in FIG. 11. In this alternate configuration, each fin is at least four times higher than wider thereby exposing a greater sidewall 133 surface area to the working fluid.

Figure 12:
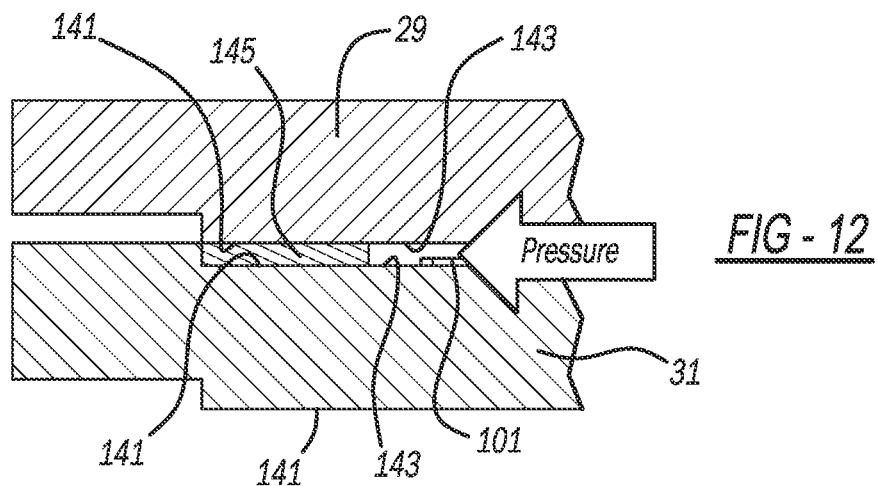
FIGS. 12-14 are a series of diagrammatic views showing different gasket sealing between adjacent plates of the present heat exchanger.
Figure 13:
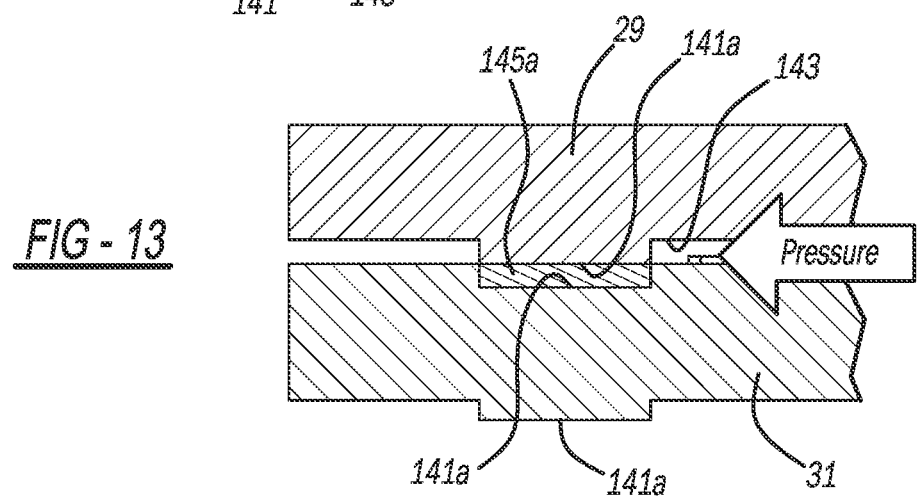
Figure 14:
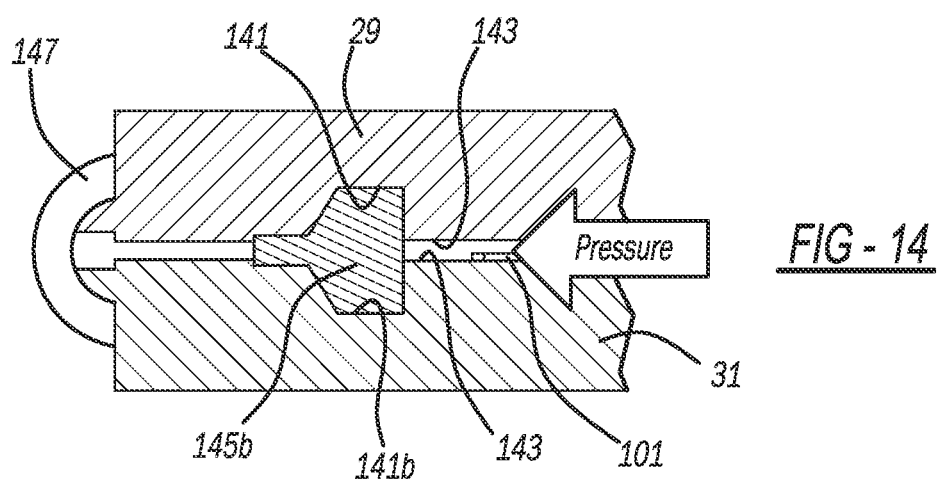
Figure 15:
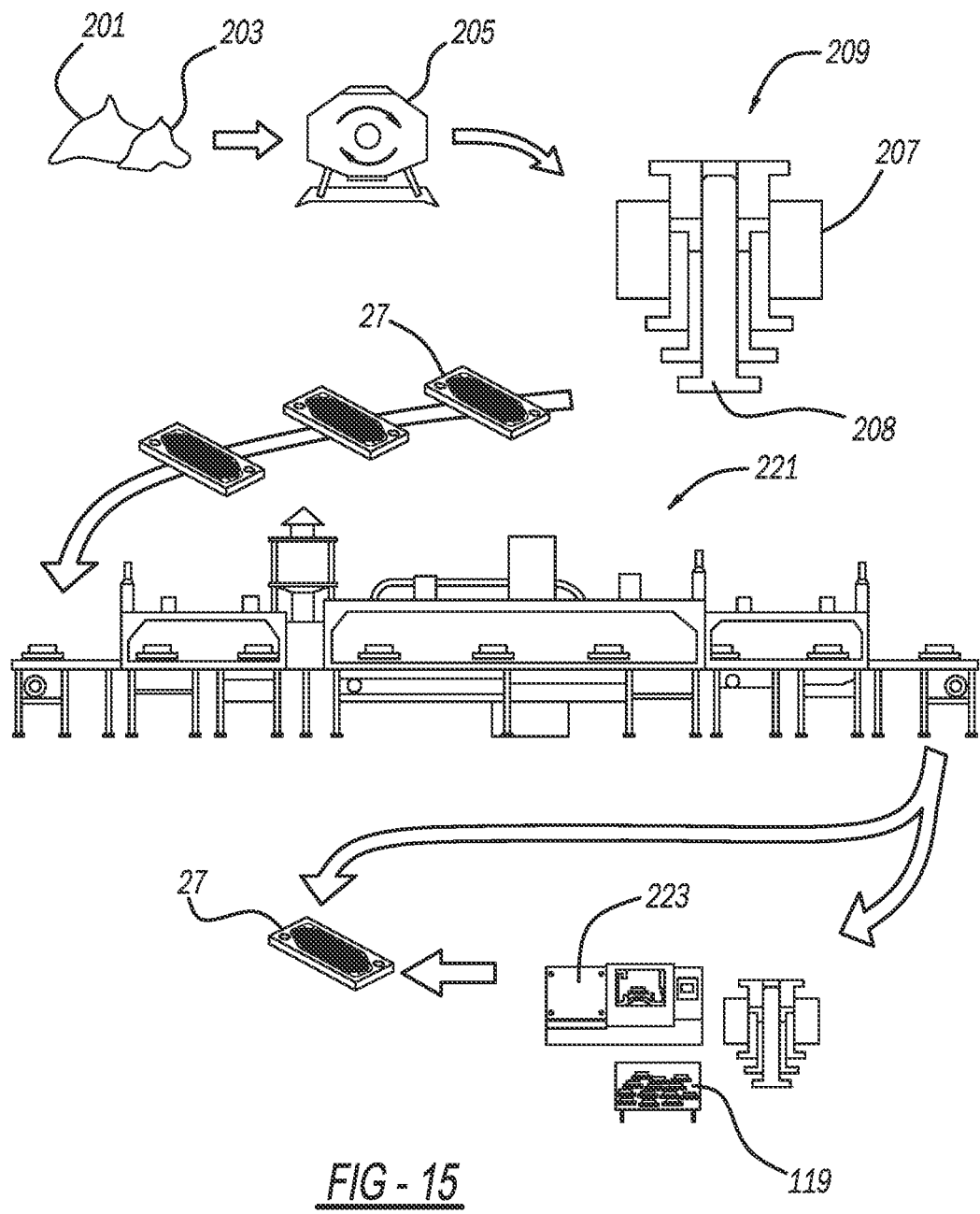
FIG. 15 is a diagrammatic view showing manufacturing equipment used to make the present heat exchanger.
Figure 16:
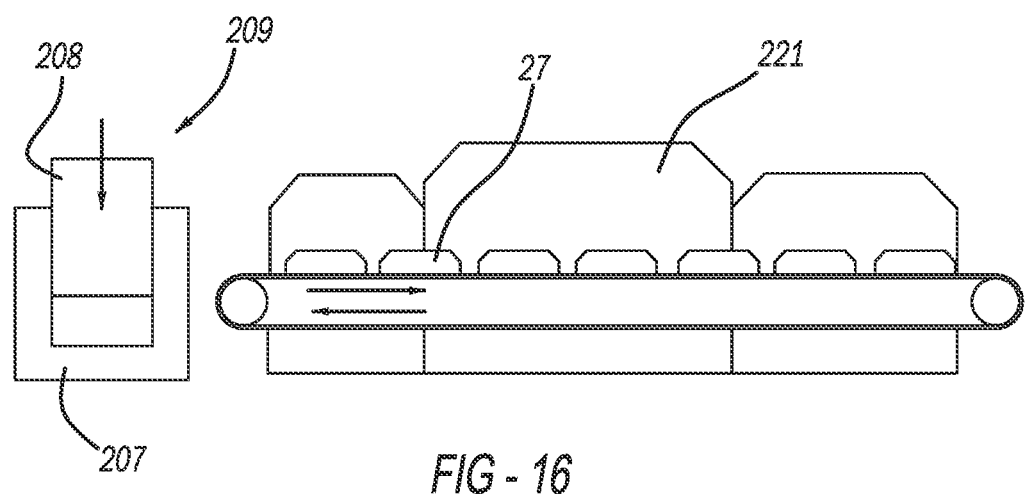
FIG. 16 is a diagrammatic view showing press and sintering of the present heat exchanger.

Referring now to FIGS. 4, 5 and 12-14, a sealing surface 141 is located on both opposite faces of each plate 27 adjacent a periphery of sunken or depressed nominal face surface 143 from which fins 101 project. Ports 61 and 63 (as well as 65 and 67 from FIG. 2) are within the depressed nominal face surface 143 and surrounded by the peripheral sealing surface 141. A gasket 145 is provided on sealing surface 141 to provide a fluid seal between adjacent stacked plates 27. Each gasket 145 is preferably of a metal or ceramic type that can withstand up to 1700 bar of pressure using clamps 147 and/or the clamping bolts 35 of FIG. 1. Welding, riveting or other methods of attaching the gasket may be used. An exemplary sealing gasket can be obtained from Garlock Sealing Technologies Inc., Parker-Hannifin Corp. or James Walker and Co. Ltd. Different options of shapes and steps for sealing surfaces 141 and gaskets 145, peripherally surrounding fins 101 and surface 143, are shown in FIGS. 12-14.

The plate and fin material is now described. In one embodiment, the plate composition is a high temperature super-alloy (for example, Haynes 214 or Haynes 230) mixed with ceramic dispersants such as $Y_2O_3$, $TiO_2$, $ZrO_2$, to enable grain boundary modification and good strength at the highest expected operating temperatures, such as 1100° C. The present alloy is in powder form with the powder layers closest to plate surface 143 and in contact with sc-$CO_2$ being formulated to have a heavy content of chromium and aluminum. This will enable the formation of $Cr_2O_3$ and $Al_2O_3$ layers which are highly resistant to sc-$CO_2$ corrosion. This plate configuration is expected to enable a high heat exchanger effectiveness of at least 0.70 for 50 kW.

TABLE 1

Nominal composition for preferred nickel-based alloy: Weight %

| | |
|---|---|
| Nickel: | 57 Balance |
| Chromium: | 22 |
| Tungsten: | 14 |
| Molybdenum: | 2 |
| Iron: | 3 max. |
| Cobalt: | 5 max. |
| Manganese: | 0.5 |
| Silicon: | 0.4 |
| Niobium: | 0.5 max. |
| Aluminum: | 0.3 |
| Titanium: | 0.1 max. |
| Carbon: | 0.1 |
| Lanthanum: | 0.02 |
| Boron: | 0.015 max. | plus minority % by weight of $Y_2O_3$, $TiO_2$ and/or $ZrO_2$

MA 957 has a nominal composition of 14 wt % Cr, 0.9% Ti, 0.3% Mo, and 0.25% Y 2O3 with Iron making the balance (i.e., 84.55% Fe). This nickel-based alloy is resistant to corrosion, which is otherwise prevalent due to the high temperatures of sc-$CO_2$.

TABLE 2

Iron-based MA 956 alloy chemical composition, wt. %

| | |
|---|---|
| Iron | Balance* |
| Chromium | 18.5-21.5 |
| Aluminum | 3.75-5.75 |
| Titanium | 0.2-0.6 |
| Carbon | 0.1 max. |
| Yttrium oxide | 0.3-0.7 |
| Copper | 0.15 max. |
| Manganese | 0.30 max. |
| Cobalt | 0.3 max. |
| Nickel | 0.50 max. |
| Phosphorus | 0.02 max. |

*Reference to the "balance" of an alloy's composition does not guarantee this is exclusively of the element mentioned, but that it predominates and others are present only in minimal quantities.

In a second material embodiment, fins 101 and heat exchanger plates 27 are manufactured from oxide dispersion strengthened ("ODS") ferrous alloys, in particular using constituents from MA 956 or MA 957. These alloys consist of finely distributed oxide, such as $Y_2O_3$, $TiO_2$, $ZrO_2$ particles, in a ferrite matrix. They offer high mechanical strength and excellent oxidation resistance. The ceramic particles aid mechanical strength in two ways: they are stable at high temperature and impede creep when optimally distributed in the parent alloy matrix; and during thermo-mechanical processing, they enable the formation of favorable grain boundary structures, which are sustained at high temperatures. MA 957 has a reported Young's modulus of 75 GPa and yield strength of 80 MPa at 1100° C. Oxide dispersants of different compositions and sizes will be incorporated to further improve the creep resistance at 1100° C. The larger lattice parameter of the oxide phases impedes dislocation motion and grain boundary sliding at high temperature, thereby minimizing creep and thermal deformation.

The manufacturing steps will now be set forth with reference to FIGS. 4 and 15-18. The base powder alloy 201 and oxide material 203 are first mixed together in a mixer 205. The mixed powder is then placed in a mold 207 and pressed in a pressing machine 209 with a linearly moveable punch 208.

Hot or hydro isostatic pressing ("HIP") is employed in one manufacturing embodiment of the present heat exchanger apparatus to make, for example, each heat exchanger plate 27 with the associated integrally formed and single piece fins 101. The HIP manufacturing process uses press 209 to reduce porosity of the powder metal while increasing its density. The HIP process applies pressure to the powdered nickel or iron-based metal alloys from all directions, thus isostatically, forming and creating the heat exchanger component within a heated chamber or pressure vessel. Inert gas, such as argon, is used to apply the pressure. The temperatures are about 482° C. to 1320° C., with pressures between 50.7 MPa-310 MPa during the pressing. Powder metallurgy is employed with the hot isostatic pressing to obtain desired grain boundary structure of the formed plate 27 and optionally, thereafter drop-forging (to increase component strength in a machine 119) in conjunction with laser directed energy deposition ("DED") additive manufacturing ("AM") in a sintering machine 221. The Hipping will relieve residual stresses in the heat exchanger plate and fins, to improve part durability.

Optional CW Laser peening provides a finishing technology that can achieve grain boundary modification at highly localized areas of concern, such as at fins 101 or sealing area 141. The CW laser peening is expected to enhance fatigue life of plate 27 by an order of magnitude. Laser directed energy deposition additive manufacturing will be used to deposit nickel-based alloy powder with oxide strengtheners on nominal plate surfaces 143 that will come in contact with sc-$CO_2$.

Furthermore, polishing (which includes fine grinding) is needed to create nano-smooth sealing surfaces at sealing area 141 to receive gasket 145. To this end, a magnetic assisted finishing ("MAF") process and machine 223 will be employed. MAF uses flexible brushes having a ferrous metal together with abrasive particles, each of about 100 nm in size, typically in a liquid medium. The brushes are attached to rotating spindles with a permanent or electromagnet actuator. Surface finishing is achieved by the abrasives in the brush as the spindle rotates, translates and/or oscillates against the work surface. MAF can be effectively used to finish complex internal and external surface geometries such as those employed with plates 27.

Figure 17:
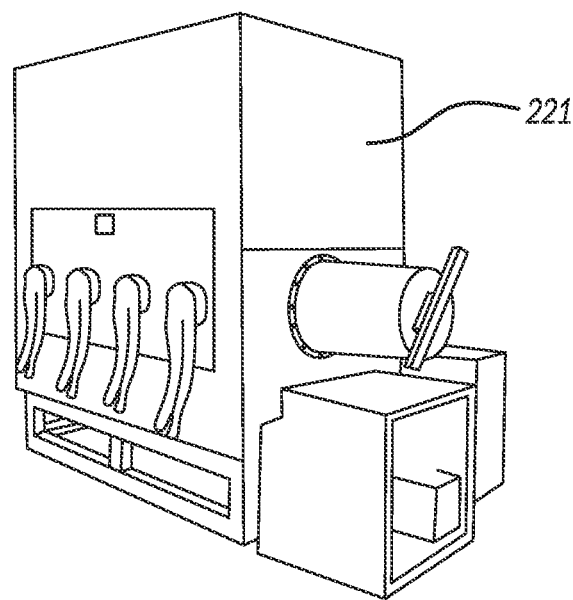
FIG. 17 is a perspective view showing a direct laser sintering machine used to make the present heat exchanger.
Figure 18:
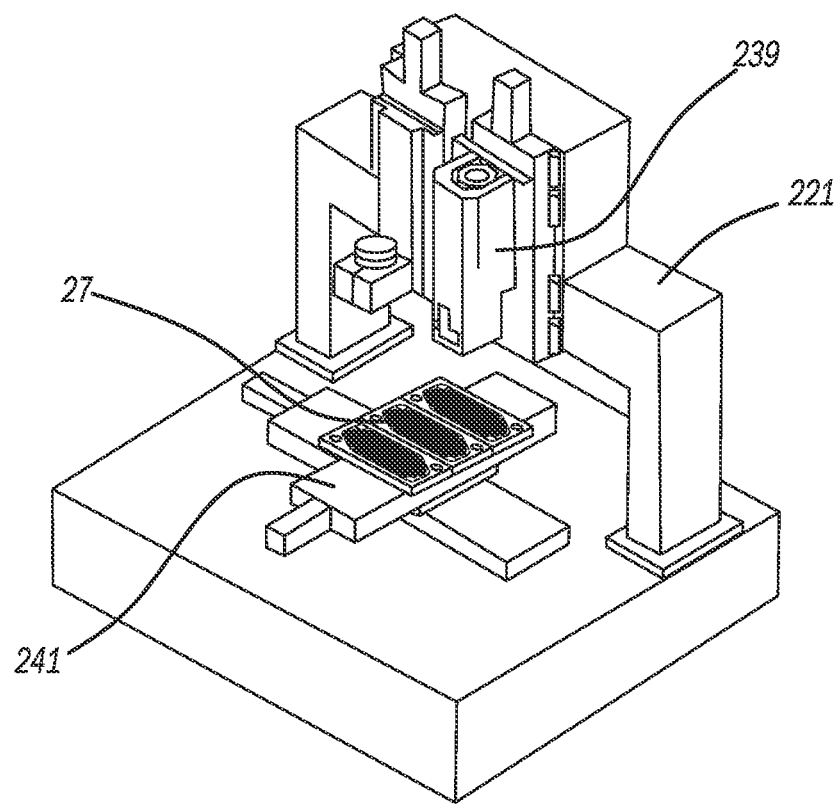
FIG. 18 is a perspective view showing a direct metal laser sintering machine used to make the present heat exchanger.

Direct metal laser sintering (also known as selective laser melting or directed energy deposition) employs a 200 watt Yb-fiber optic laser 239 within the machine 221 shown in FIGS. 17 and 18. A spaced-apart platform 241 is moveable to hold the powder metal alloy as it is additively built up, layer-by-laser with the laser melting together each layer, until the final plate 27 and ribs are created (in one version);

or the platform holds an already pressed and formed powder plate 27 below the laser for subsequent treatment (in another version).

Heat exchanger plate 27 with ribs 101 manufacturing steps-Version 1:
- Step 1: Mixing powder;
- Step 2: Inserting the powder into a Direct Metal Laser Sintering ("DMLS") machine to produce the plate with fins;
- Step 3: Removing the produced plates with fins;
- Step 4: Treating the plates by hot isostatic pressing (HIPPING);
- Step 5: Polishing a seal region of the plate with a grinding wheel or magnetic assisted finishing to achieve a surface roughness of approx. 1 mm or less within a flat plane;
- Step 6: Adhering or riveting a gasket on a face of the plate containing the fins, adjacent a periphery; and
- Step 7: Assembling the finished plates together to create a heat exchanger.

Heat exchanger plate 27 with ribs 101 manufacturing steps-Version 2:
- Step 1: Mixing powder and inserting the powder to be approximately 5 mm thick into an open mold box;
- Step 2: Compacting the powder and releasing a green compact;
- Step 3: Sintering the compacted powder, now a generally flat nominal surface of a plate with fins, in a furnace;
- Step 4: Treating the sintered plate by hot isostatic pressing (HIPPING);
- Step 5: Placing the plate into the DMLS for another sintering process;
- Step 6: Polishing a seal area of the plate with a grinding wheel or magnetic assisted finishing;
- Step 7: Adhering or riveting a gasket on the polished area of the plate containing the fins, adjacent a periphery; and
- Step 8: Assembling the plates into the heat exchanger.

Heat exchanger plate 27 with ribs 101 manufacturing steps- Version 3:
- Step 1: Fabricating or creating a fugitive phase in a reverse or negative shape of fins;
- Step 2: Mixing powder and inserting the powder into an open mold box with the fabricated fugitive phase on a top and a bottom of the mold;
- Step 3: Compacting the powder and releasing the green compact;
- Step 4: Sintering the compacted powder, now a generally flat nominal surface of a plate with the fins, in a furnace;
- Step 5: Treating the plate by hot isostatic pressing (HIPPING);
- Step 6: Polishing a seal area of the plate;
- Step 7: Adhering or riveting a gasket on the polished area of the plate peripherally surround the fins; and
- Step 8: Assembling the plates into the heat exchanger.

While various embodiments have been disclosed, it should be appreciated that other variations may be made. For example, other working fluids may be used although certain of the present advantages may not be realized. Supercritical $CO_2$ provides superior heat capacity matching to the heat source temperature profile, is thermally stable and has a single phase nature, as compared to steam or other working fluids, thereby providing a greater working fluid temperature and efficiency. Moreover, a Z-shaped, J-shaped, V-shaped or other shaped fins may be employed, however, some benefits may not be achieved. Additional or fewer processing steps can be used, and in any order, but some advantages may not be found. Each of the claims and described features may be interchanged and intermixed in any combination. Additional changes and modifications are not to be regarded as a departure from the spirit or the scope of the present invention.

The invention claimed is:

1. A method of making a heat exchanger component, the method comprising:
   (a) metal laser sintering to melt together powder metal;
   (b) hot isostatic pressing the powdered metal by placing the sintered powder metal into an envelope and then applying fluid pressure to at least a majority of the external surfaces of the sintered powder metal while also applying heat;
   (c) creating the heat exchanger component by the sintering and pressing steps;
   (d) making the heat exchanger component from a nickel alloy comprising one of: (i) a minority by weight portions of chromium and tungsten; (ii) $Y_2O_3$; or (iii) $ZrO_2$;
   (e) polishing or grinding a sealing area; and
   (f) attaching a gasket to the sealing area of the heat exchanger component.

2. The method of claim 1, wherein the heat exchanger component comprises a heat exchanger plate including fluid-directing fins projecting from the plate and multiple through-holes.

3. The method of claim 1, wherein at least one of the fins has a substantially S-shape and at least one of: (a) an overhanging side surface, or (b) a three-dimensional twisting surface.

4. The method of claim 2, wherein the fins are supercritical-$CO_2$-heat exchanging structures upwardly projecting from a central and depressed nominal surface of the plate, the supercritical-$CO_2$-heat exchanging structures withstanding a temperature of 800-1100° C., the gasket surrounds the central nominal surface and through-holes of the plate, and an elongated middle portion of each of the fins is substantially perpendicularly oriented relative to adjacent of the fins.

5. The method of claim 1, wherein the metal laser sintering includes use of direct metal laser sintering to melt together the powder metal, and the hot isostatic pressing step occurs by placing the sintered powder metal into an envelope and then applying fluid pressure to at least a majority of the external surfaces of the sintered powder metal while also applying heat.

6. The method of claim 1, further comprising drop forging the heat exchanger component.

7. The method of claim 1, further comprising creating solid projecting fins as an integral part of a heat exchanger plate, the fins on the one side of the at least one of the plates being spaced apart from each other to channel sc-$CO_2$ between the fins, a temperature of the sc-$CO_2$ being 800-1100° C., and the gasket peripherally surrounding the fins on the one side of the at least one of the plates.

8. The method of claim 1, wherein the powder metal includes the nickel alloy with the chromium and the tungsten.

9. The method of claim 2, further comprising
   (a) creating each of the fins to have an elongated length at least four times greater than a height; and
   (b) spacing the fins located on one side of the plate differently than are the fins which are located on an opposite side of the plate.

10. A method of making a heat exchanger component, the method comprising:
(a) direct metal laser sintering to melt together powder metal;
(b) hot isostatic pressing the powdered metal by placing the sintered powder metal into an envelope and then applying fluid pressure to at least a majority of the external surfaces of the sintered powder metal while also applying heat;
(c) creating the heat exchanger component, including a plate and fins, by the sintering and pressing steps;
(d) making the plate and the fins from a nickel alloy comprising a minority by weight portions of chromium and tungsten;
(e) polishing or grinding a sealing area; and
(f) attaching a gasket to the sealing area of the heat exchanger component.

11. The method of claim 10, further comprising
(a) creating each of the fins to have an elongated length at least four times greater than a height; and
(b) spacing the fins located on one side of the plate differently than are the fins which are located on an opposite side of the plate.

12. The method of claim 10, wherein at least one of the fins has a substantially S-shape and at least one of: (a) an overhanging side surface, or (b) a three-dimensional twisting surface.

13. The method of claim 10, wherein the fins are supercritical-$CO_2$-heat exchanging structures upwardly projecting from a central and depressed nominal surface of the plate, the supercritical-$CO_2$-heat exchanging structures withstand a temperature of 800-1100° C., the gasket surrounds the central nominal surface and through-holes of the plate, and an elongated middle portion of at least some of the fins is substantially perpendicularly oriented relative to adjacent of the fins.

14. A method of making a heat exchanger component, the method comprising:
(a) direct metal laser sintering to melt together powder metal;
(b) hot isostatic pressing the powdered metal by placing the sintered powder metal into an envelope and then applying fluid pressure to at least a majority of the external surfaces of the sintered powder metal while also applying heat;
(c) creating the heat exchanger component, including a plate and fins, by the sintering and pressing steps;
(d) making the plate and the fins from a nickel alloy comprising $Y_2O_3$;
(e) polishing or grinding a sealing area; and
(f) attaching a gasket to the sealing area of the heat exchanger component.

15. The method of claim 14, further comprising
(a) creating each of the fins to have an elongated length at least four times greater than a height; and
(b) spacing the fins located on one side of the plate differently than are the fins which are located on an opposite side of the plate.

16. The method of claim 14, wherein at least one of the fins has a substantially S-shape and at least one of: (a) an overhanging side surface, or (b) a three-dimensional twisting surface.

17. The method of claim 14, wherein the fins are supercritical-$CO_2$-heat exchanging structures upwardly projecting from a central and depressed nominal surface of the plate, the supercritical-$CO_2$-heat exchanging structures withstand a temperature of 800-1100° C., the gasket surrounds the central nominal surface and through-holes of the plate, and an elongated middle portion of at least some of the fins is substantially perpendicularly oriented relative to adjacent of the fins.

18. A method of making a heat exchanger component, the method comprising:
(a) direct metal laser sintering to melt together powder metal;
(b) hot isostatic pressing the powdered metal by placing the sintered powder metal into an envelope and then applying fluid pressure to at least a majority of the external surfaces of the sintered powder metal while also applying heat;
(c) creating the heat exchanger component, including a plate and fins, by the sintering and pressing steps;
(d) making the plate and the fins from a nickel alloy comprising $ZrO_2$;
(e) polishing or grinding a sealing area; and
(f) attaching a gasket to the sealing area of the heat exchanger component.

19. The method of claim 18, further comprising
(a) creating each of the fins to have an elongated length at least four times greater than a height; and
(b) spacing the fins located on one side of the plate differently than are the fins which are located on an opposite side of the plate.

20. The method of claim 18, wherein at least one of the fins has a substantially S-shape and at least one of: (a) an overhanging side surface, or (b) a three-dimensional twisting surface.

21. The method of claim 18, wherein the fins are supercritical-$CO_2$-heat exchanging structures upwardly projecting from a central and depressed nominal surface of the plate, the supercritical-$CO_2$-heat exchanging structures withstand a temperature of 800-1100° C., the gasket surrounds the central nominal surface and through-holes of the plate, and an elongated middle portion of at least some of the fins is substantially perpendicularly oriented relative to adjacent of the fins.

* * * * *